Sept. 28, 1965  R. HASKINS  3,208,616
PORTABLE STORAGE BIN
Filed July 19, 1963  7 Sheets-Sheet 1

INVENTOR.
ROY HASKINS
BY
Wells & St. John
ATTYS.

Sept. 28, 1965   R. HASKINS   3,208,616
PORTABLE STORAGE BIN
Filed July 19, 1963   7 Sheets-Sheet 2
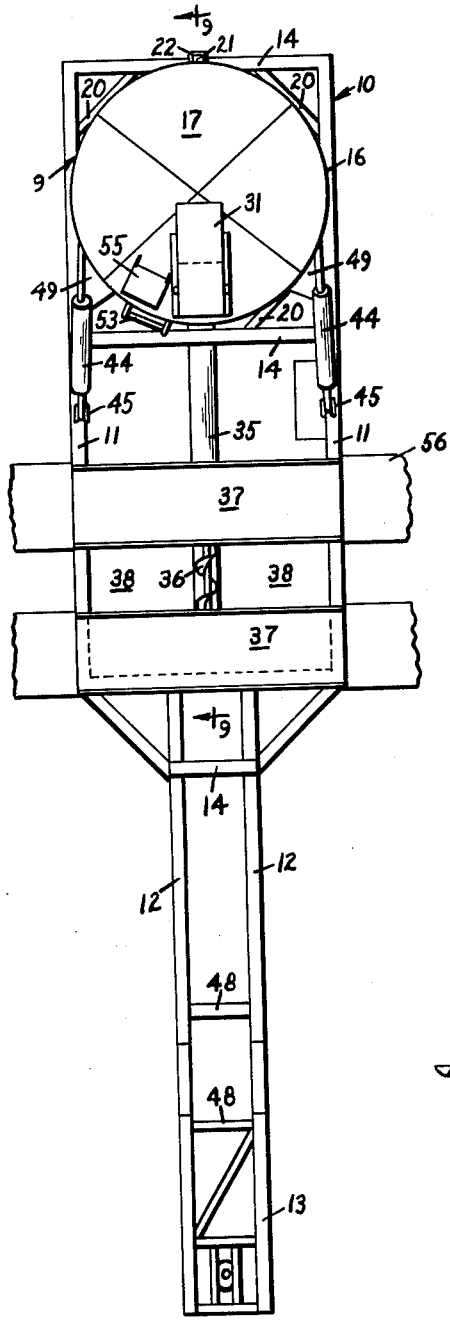
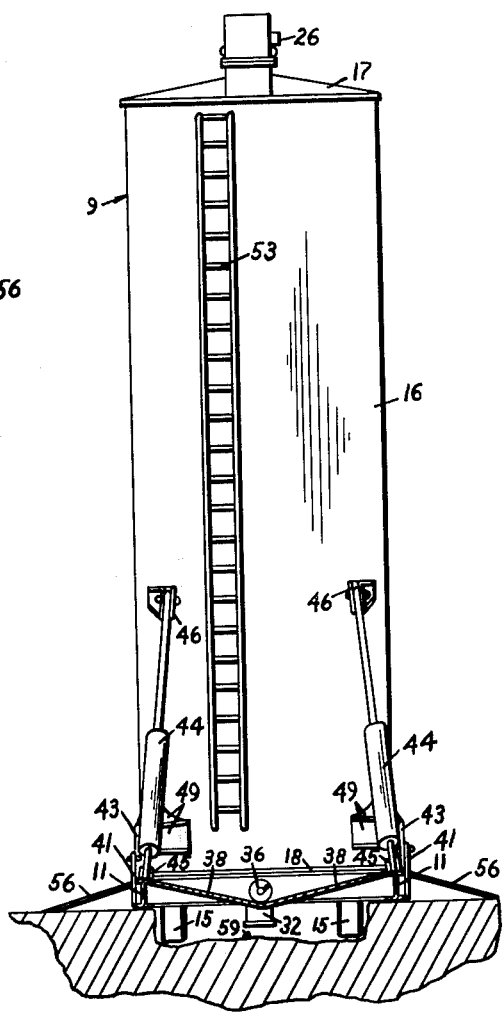
INVENTOR.
ROY HASKINS
BY
ATTYS.

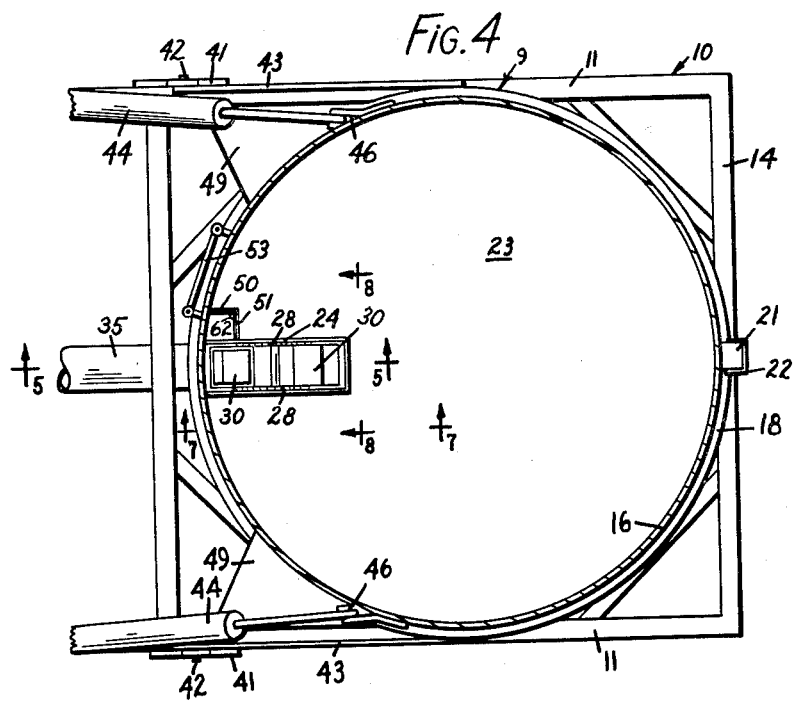
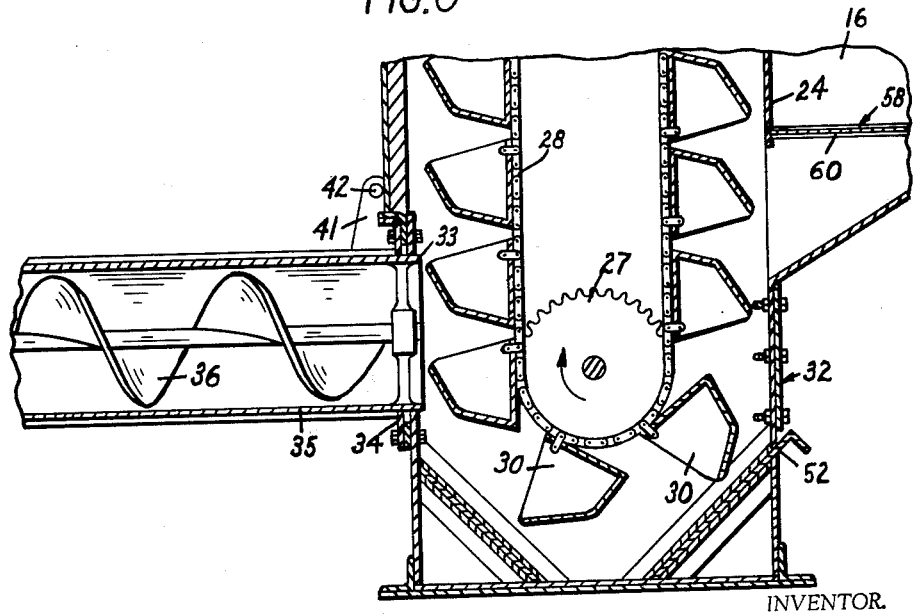

Sept. 28, 1965  R. HASKINS  3,208,616
PORTABLE STORAGE BIN
Filed July 19, 1963  7 Sheets-Sheet 4
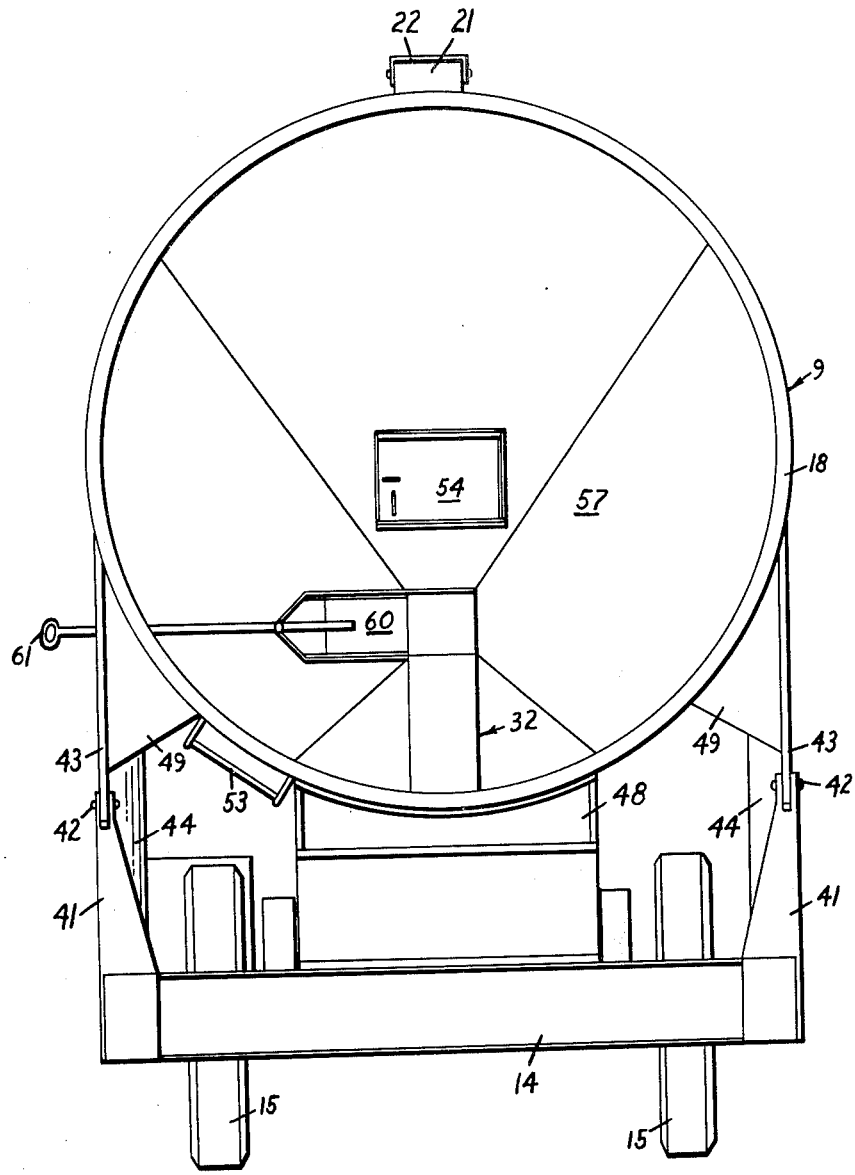
INVENTOR.
ROY HASKINS
BY Halle & St. John
ATTYS.

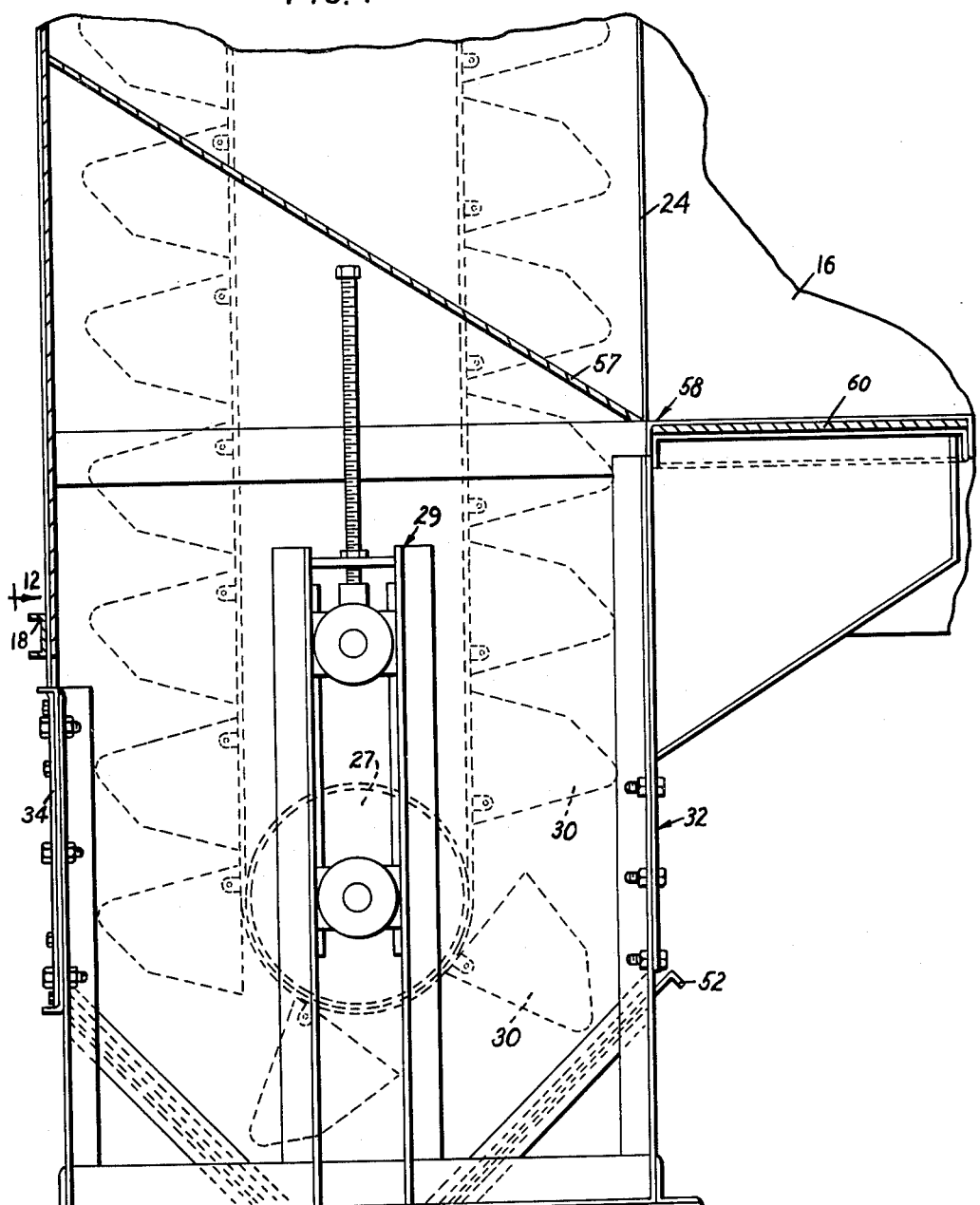

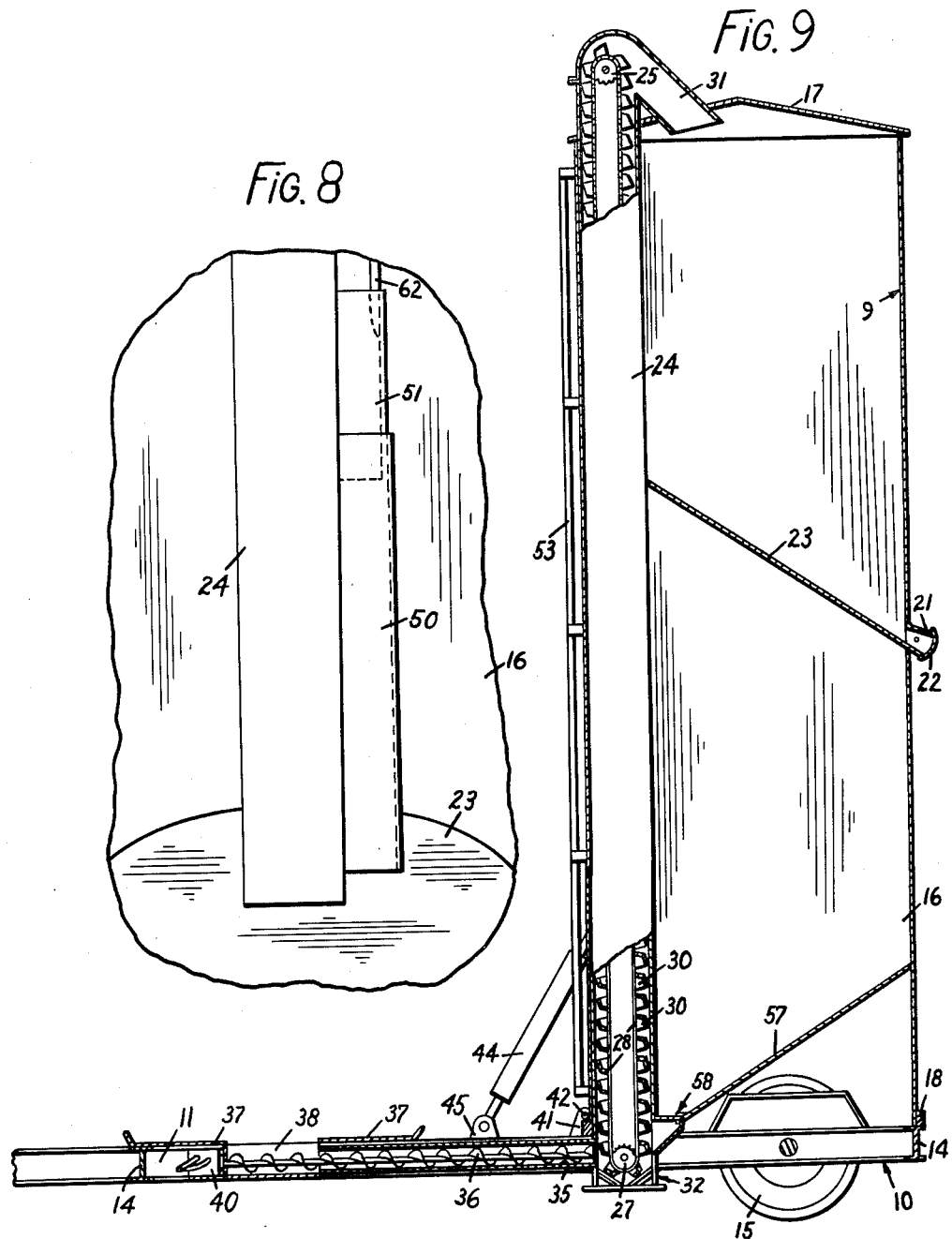

Sept. 28, 1965   R. HASKINS   3,208,616
PORTABLE STORAGE BIN
Filed July 19, 1963   7 Sheets-Sheet 7

INVENTOR.
Roy Haskins
BY Walla & St John
ATTYS.

United States Patent Office 3,208,616
Patented Sept. 28, 1965

3,208,616
PORTABLE STORAGE BIN
Roy Haskins, E. 3613 Main Ave., Spokane, Wash.
Filed July 19, 1963, Ser. No. 296,278
2 Claims. (Cl. 214—508)

This invention relates to a novel portable storage bin for the storage of dry materials such as grain, fertilizer, seed, or other flowable materials.

The present invention is concerned with a storage bin which is portable and fully automatic, capable of acting as a grain elevator or storage bin in the field. The bin is movable from a horizontal transport position on a mobile framework to a vertical storage position in which it is capable of storing a day's supply of grain, seed, fertilizer, peas, beans, or other dry flowable material. The bin features a top compartment which is used to load highway trucks for transport purposes and a lower overflow compartment to which excess material is automatically shunted for selective transfer to the upper compartment at a later time. The apparatus also features delivery and elevating means for transferring materials from a field truck to the upper compartment of the storage bin.

It is a first object of this invention to provide a storage bin for field use which can be of the size necessary to handle a day's harvest, but which can be tilted to a horizontal position on a mobile framework so as to be moved about the field as desired.

Another object of this invention is to provide such a tiltable bin which can be shifted between its horizontal and vertical positions by hydraulic cylinders mounted on the mobile framework that supports the bin for travel purposes.

Another object of this invention is to provide a novel overflow compartment in an overhead storage bin to automatically receive excess material so as to insure complete filling of the storage compartment and provision of a full load for a highway transport truck filled therefrom.

These and further objects will be evident from a study of the following disclosure taken in conjunction with the accompanying drawings, which illustrate one preferred form of the invention. It is to be emphasized at the outset that the preferred structure illustrated the drawings is not intended to limit or restrict the scope of the invention, which is set out in the claims that follow the detailed description.

In the drawings:

FIGURE 2 is a top view of the apparatus seen in FIGURE 1, the tank being shown in its upright position;

FIGURE 3 is a sectional view of the tank in its upright position as seen along line 3—3 in FIGURE 1;

FIGURE 4 is an enlarged sectional view of the tank as seen in its upright position along line 4—4 in FIGURE 1;

FIGURE 5 is an enlarged vertical sectional view taken along line 5—5 in FIGURE 4, illustrating the lower end of the elevating bucket conveyor and its cooperation with the delivery auger conveyor;

FIGURE 6 is a rear end view of the apparatus in its transport position;

FIGURE 7 is an enlarged sectional view of the lower end of the elevating bucket conveyor taken along line 7—7 in FIGURE 4, showing the bucket conveyor in hidden lines;

FIGURE 8 is a fragmentary enlarged view of the interior of the upper storage compartment as seen along line 8—8 in FIGURE 4;

FIGURE 9 is a longitudinal sectional view taken through the tank along line 9—9 in FIGURE 2;

Figure 1:
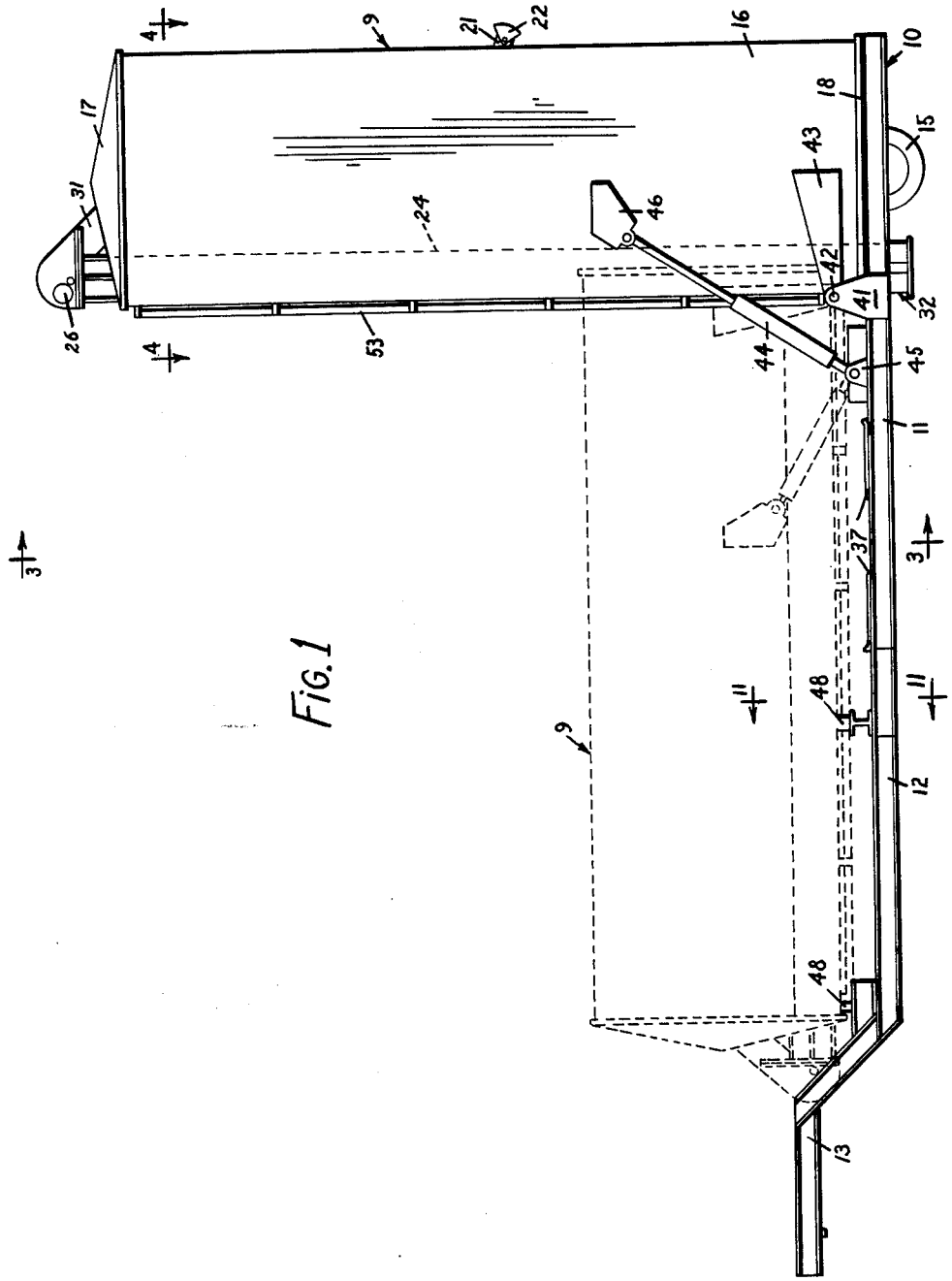
FIGURE 1 is a side view of the apparatus, showing the storage tank in its vertical position, the horizontal or transport position of the tank being illustrated in dashed lines.

The present invention is designed to provide a storage elevator or storage bin adapted primarily for field use in the storage of grain, beans, or other crops, and also in the storage of dry material such as fertilizer, seed or cement.

Referring particularly to the harvest of grain, beans, or similar crops, it is prevalent now to carry the output of a combine or a harvesting machine directly over the highway to storage elevators, from which the grain is again moved to central elevators. This involves the use of highway trucks by the individual farmer and results in much lost time on the highway during the transporting of the commodity. The present invention is designed to provide a portable storage tank that can be set up in the field adjacent the harvesting operation, adapted to store a day's output from a combine or similar machine so that only one daily trip by a highway truck is necessary, and this trip can be made directly to the final storage elevator. In this manner larger trucks can be utilized, and the farmer himself need only use field trucks between the harvesting equipment and the storage tank.

As seen in FIGURES 1 to 3 and 9, the apparatus is carried on a supporting framework generally denoted by the numeral 10. The framework 10 is comprised of rear side members 11 that extend longitudinally along the length of the framework 10 and which join forward members 12 that lead to a raised section 13 for a conventional fifth wheel trailer hitch. Transverse beams 14 complete the rigid framework 10 and provide the necessary lateral connections between the members 11 and 12. The framework 10 is a mobile framework, and is mounted on a pair of wheels 15 in a conventional manner, so that as the framework 10 is pulled by a tractor (not shown) the weight of the framework 10 will be distributed between the forward hitch and the rear mounted wheels 15.

Mounted adjacent the rear of the framework 10 is a container 9 having a cylindrical wall 16. The wall 16 is capped by a cover 17 and is provided with an annular reinforcing rim 18 at its lower edg.e The rim 18, when the container 9 is in the upright position shown in FIGURES 1, 2 and 3, is adapted to rest on the side members 11 of framework 10 and diagonal members 20 in the framework 10 which form a substantially complete supporting surface directly under the walls 16.

Mounted intermediate the height of the container 9, and at the exterior thereof, is a spout 21 that is in open communication with the interior of the container 9. The spout 21 is provided with a closable cover 22 which is adapted to selectively open the outlet of the spout 21 or close it as desired. Mounted across the wall 16 and directly below the lower opening of spout 21 is a first floor 23 that is plane in shape. The floor 23 defines the lower limit of the upper storage compartment within the tank walls 16. The floor 23 is sealed about an enclosed rectangular shaft 24 for the elevating conveyor, which will be described below. The shaft 24 in turn is sealed to the adjacent interior surface of the tank wall 16 so that material within the tank and above the floor 23 is directed toward and can only pass through the spout 21 for exit from the container 9.

Mounted within the enclosed rectangular shaft 24, which extends the full height of container 9, is a conveyor mounted on upper sprockets 25 and lower sprockets 27.

The upper sprockets 25 are rotated by a hydraulic driving motor 26, which can be seen in FIGURE 1. The lower sprockets 27 are adjustably mounted for vertical movement by a conventional adjustable bearing assembly generally designated as 29, and shown in FIGURE 7. Connecting the sprockets 25 and 27 are a pair of chains 28 which carry a series of conventional lifting buckets 30. The buckets 30 are designed to scoop materials at the lower end of the conveyor and dump them onto a receiving chute 31 which can best be seen in FIGURE 9. The conveyor shaft 24 is extended below the bottom of the tank walls 16 into a boot 32 which is closed at its bottom end as seen in FIGURES 5, 7 and 9.

Figure 12:
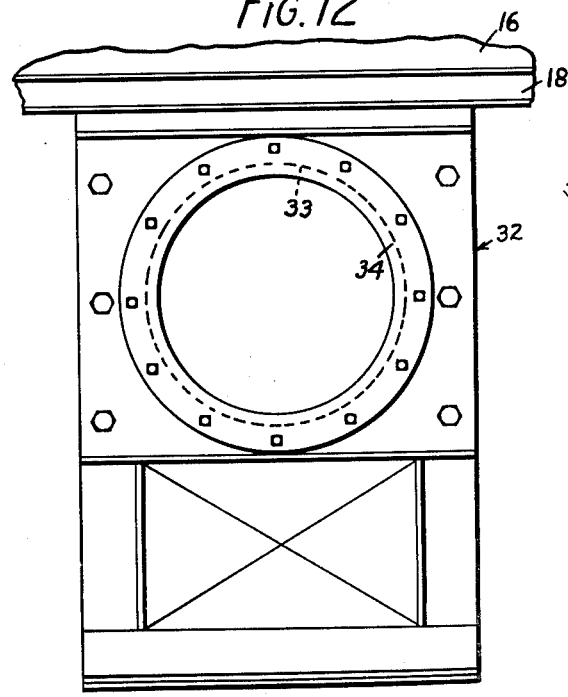
FIGURE 12 is a view of the front surface of the conveyor boot as viewed along line 12—12 in FIGURE 7.
Figure 11:
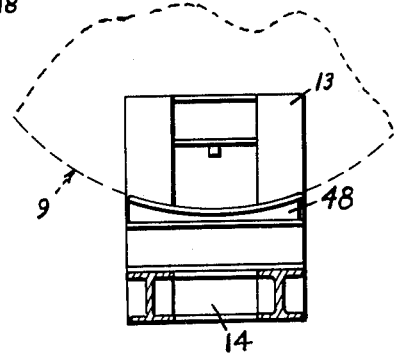
FIGURE 11 is a section view taken along line 11—11 in FIGURE 1, showing the storage position of the tank in dashed lines.

In order to allow for the reception of materials within the boot 32, it is provided with a circular aperture 33 along the front surface thereof sealed by a circular rubber gasket 34 (FIGURES 7, 12). The rubber gasket 34 is adapted to seal about a cylindrical auger casing 35 projecting rearwardly in a central longitudinal position on the framework 10. This sealing engagement can best be seen in FIGURES 5 and 9. Mounted within the housing 35 is a conveying rotatable auger 36 which is adapted to longitudinally move grain or other material along the length of the framework 10 in a rearward direction.

As can be seen in FIGURES 2 and 9, the auger housing 35 extends forwardly to a position directly under a first transverse track 37 mounted across the top of the framework 10. There is provided a second spaced track 37 under which is mounted the driving motor 40 for the auger 36. Between the tracks 37 are two sloped floor portions 38 directed downwardly toward the center of the framework 10 and directly under the auger 36. The tracks 37 are spaced on the framework 10 so as to support a field truck driven across them, such trucks being provided with a dump door along the bottom of their storage compartments adapted to direct material to be stored onto the floor portions 38, which in turn will direct the material by gravity to the auger 36.

The tank walls 16 are pivotally mounted on the framework 10 by rigid pivot supports 41 at each side of the framework 10 and fixed to the side members 11. A pivot shaft 42 on each support 41 is connected to a tangential extension 43 fixed to the tank walls 16. The extensions 43 are reinforced by connecting webs 49, which can best be seen in FIGURE 6.

In order to shift the tank walls 16 from the upright position used for storage to the transport position used for movement of the apparatus, there are provided a pair of hydraulic cylinder assemblies 44, one being mounted at each side of the framework 10. The cylinder assemblies 44 are pivotally connected at their respective ends connected to anchors 45 on the framework 10 and anchors 46 on the exterior of the tank walls 16. The motion by which the container is moved by contraction or expansion of cylinder assemblies 44 is believed to be evident from the showing of FIGURE 1.

Mounted along the length of the framework 10 are supporting arch supports 48 that position the tank walls 16 when in their horizontal position. It is contemplated that the cylinder assemblies 44 will be double acting cylinders, and that much of the weight of the container 9 will be carried by the cylinder assemblies 44, even during the transporting of the apparatus from one locality to another in the horizontal position of container 9.

Mounted adjacent the lower end of the tank wall 16 is a lower floor 57 which is directed toward an opening 58. The lower floor 57 defines the bottom of the lower storage compartment adapted to hold the overflow from the upper compartment. The opening 58 is selectively closed by a slidable door 60 which can be seen in FIGURE 6. The door 60 is shiftable by a manual handle 61 from an open position in which material resting on the floor 57 is directed into the boot 32, and a second closed position in which material is retained in the lower tank compartment.

In order to allow material to be transferred from the upper compartment to the lower compartment for overflow compensation, there is provided an overflow passage 50 sealed to the tank walls 16 and to one wall of the rectangular shaft 24 for the elevating conveyor. This structure is best seen in FIGURES 4 and 8. The walls of passage 50 have an upper telescoping section 51 that is manually shiftable by means of a rod 62 so as to allow the elevation of the upper end of passage 50 to be varied. By this means, the amount of material that is stored in the upper compartment can be selectively adjusted so that a full truckload will be maintained in the upper compartment while excess material will flow through the overflow passage 50 to the lower compartment defined by the lower floor 57. The bottom end of the open passage 50 is merely extended slightly below the upper floor 23.

Mounted at the lower end of the boot 32 is a movable gate 52 that can be manually opened for cleaning of the lower end of the conveyor passage compartment. This is seen in FIGURE 5. The two compartments of the storage tank are provided with access openings from the exterior of the tank, the lower tank access door being shown at 54 in FIGURE 6 and the upper tank access door being shown at 55 in FIGURE 2. There is also provided a ladder 53 along the outside of the tank wall 16 so that a person desiring to work on the elevating conveyor or desiring to clean the upper storage tank can have full access to the top of the tank.

In operation, the framework 10 is drawn to the desired location for the setting up of the tank walls 16, and the ground is dug slightly as can be seen in FIGURE 3, so as to provide a recess for the reception of the wheels 15 and the lower end of the boot 32, which protrudes below the intended ground line of the apparatus when the tank is erected. The wheels 15 are driven into the trench, which is generally designated by the numeral 59, and when the removal of the tank is desired, the wheels 50 are merely drawn out of this trench 59.

When the framework 10 has been released from the tractor (not shown) and the lower surfaces of the side members 10 and 11 are resting on a flat ground surface, the apparatus is ready to be erected for storage use. This is effected by expanding the cylinder assemblies 44, thereby shifting the container 9 about the pivot shafts 41. The double acting nature of cylinder assemblies 44 provides complete control over the erection of the container so that it can be brought down upon the framework 10 without damage to either the tank wall 16 or the framework 10. As the tank walls 16 reach the vertical position, the rubber gasket 34 at the forward surface of boot 32 will receive the auger housing 35 in a sealed relationship. The apparatus is then ready for use, pressure being maintained on the cylinder assemblies 44 at all times so as to insure against tilting of the tank when not desired.

The tracks 37 on the framework 10, which are designed to support the field trucks, are elevated slightly above the ground surface as can be seen in FIGURE 3. Therefore ramps 56 are used at the sides of the framework 10 to facilitate the entry of trucks over the tracks 37. After a truck has been positioned on the tracks 37, the material within the truck can be dumped downwardly onto the floor sections 38 which will direct the material to the exposed portion of auger 36.

Auger 36 is designed to carry the material longitudinally along the frame 10 and into the lower end of the boot 32. The constantly moving buckets 30 of the elevating conveyor will then carry the material to the top of the tank and dump it onto the receiving chute 31, thereby filling the space bounded by the cover 17 and the upper floor 23.

When the level of material in the upper compartment has reached the top of the movable telescoping section 51 in the overflow passage 50, the excess material will flow through the passage 50 and be transferred to the lower compartment bounded by the floor 23 and the lower floor 57. After emptying of the upper compartment by moving the cover 22 on spout 21 to thereby direct the stored material to a truck driven alongside the rear of the tank, the slidable door 60 can be manually opened so as to shift the material in the lower compartment into the boots 32 so that it can be returned by buckets 30 to the upper compartment. In this manner the complete filling of the upper compartment can be insured without manual checking of its contents, and overflow material can be accommodated in the single container 9. When the storage of material from a particular location has been completed, the empty tank is returned to its horizontal position and pulled from the trench 59 by the tractor which is to propel it to a new position.

Figure 10:
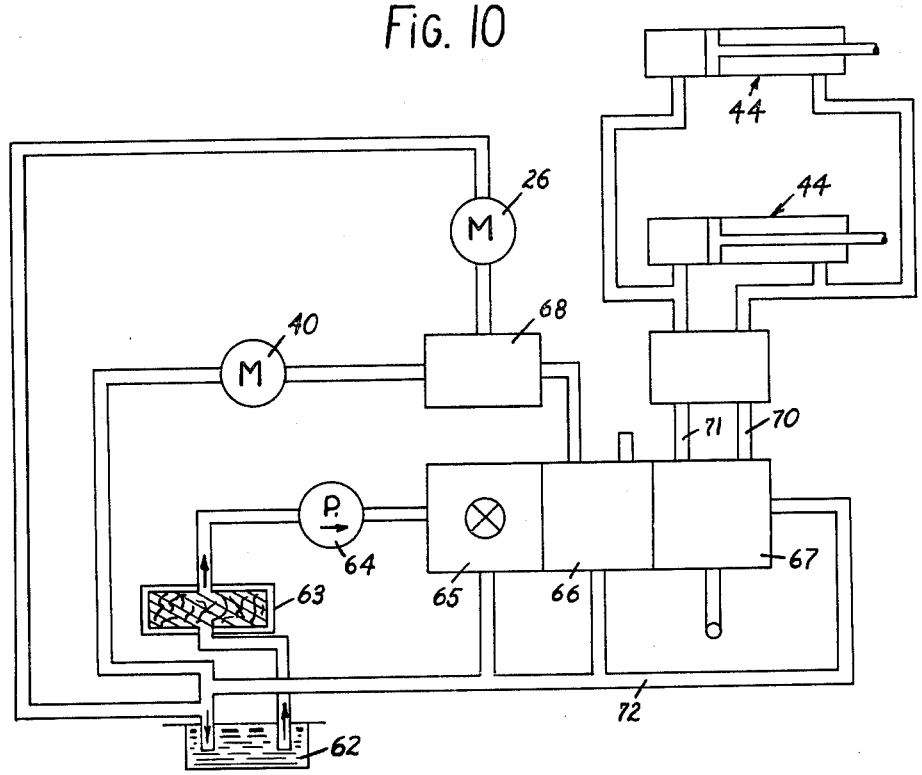
FIGURE 10 is a schematic hydraulic diagram showing the controls for the operating mechanisms of the apparatus.

A typical control system for the hydraulic elements used to operate the various portion of the apparatus is shown schematically in FIGURE 10. The device includes a reservoir 62 which supplies hydraulic fluid through a filter 63 to a pump 64. Pump 64 is connected to the inlet of a series of valves including a relief valve 65, a two-way valve 66 and a four-way valve 67. The two-way valve 66 blocks or releases fluid to a flow control valve 68 which in turn regulates the speed of the hydraulic motors 26 and 40 which respectively drive the elevating conveyor and auger conveyor.

The outlets 70 and 71 from a four-way valve 67 are connected through an interlock 72 to the respective sides of the two cylinder assemblies 44. The lines 71 and 70 are alternately supplied with fluid or exhausted in order to utilize the cylinder assemblies 44 for moving the tank under power in either direction, there being pressure maintained at both sides of the pistons within the cylinder assemblies 44. The valves 65, 66 and 67 are exhausted through a common return 72 which leads back to the reservoir 62. Various safety devices and equivalent valves could be substituted in this hydraulic circuit without deviating from the basic results or purposes desired.

The particular device illustrated in the drawings has been manufactured and used in conjunction with a tank 10½ feet in diameter and 32 feet high. This is raised and lowered by two six inch hydraulic cylinders having a stroke of five feet, and exerting a maximum pressure of 37 tons. The upper compartment of this tank holds 900 bushels of grain above a spout which is 14 feet above the ground line. Grain from the upper compartment can be emptied by gravity into a trailer in seven or eight minutes. The flow control valve 68 allows the operator to utilize various speeds of motors 40 and 26 to prevent damage to more fragile crops such as peas or beans by using slower speeds for the conveyong of them.

Various features described in particular above could be modified and equivalent devices substituted in their places. For this reason the specific arrangement is intended only as an example, and is not to restrict the invention beyond the definitions of the following claims.

Having thus described my invention, I claim:

1. A storage tank assembly for dry materials, comprising:

a mobile supporting framework adapted to rest in ground contact;

pivot means mounted on said framework at the rear end thereof;

a container pivotally mounted on said framework by said pivot means for movement about a transverse horizontal axis relative to said framework between a first position wherein the central longitudinal axis of the container is in a horizontal position and a second position wherein the last-named axis is in an upright position, the lower end of said container being supported on the rear end of said framework when said container is in said second position;

a floor extending across the container interior;

material elevating means fixed to said container for pivotal movement therewith and including an inlet below the floor when said container is in its second position and an outlet located on the opposite side of said floor;

material delivery means on said framework in communication with the inlet of said material elevating means when said container is in its second position;

said floor being sloped toward a closeable spout on the container exterior in communication with the exterior of said container;

transverse supporting tracks located over a portion of said material delivery means between said container, when in said second position, and the front end of said framework, whereby vehicles can be supported on said tracks during transfer of materials from the vehicles to said material delivery means; and said container, when in said first position, being located closely adjacent to and overlying the transverse tracks and material delivery means.

2. A storage tank assembly for dry materials, comprising:

a mobile supporting framework;

an enclosed tank carried upon said framework about a horizontal pivotal axis, said tank being pivotally movable from a first position parallel to said framework to an upright position resting on said framework;

an elevating conveyor mounted within said tank and extending from a protruding shoe at the lower end of said tank to the top end of said tank;

a spout located intermediate the length of said tank in communication with the interior of said tank;

a hopper floor extending across said tank interior and sloping toward said spout;

a horizontal auger conveyor on said framework leading to said shoe in open communication therewith when said tank is in its upright position;

a second hopper floor extending across said tank interior spaced below said first-named hopper floor when said tank is in its upright position, said second hopper floor being sloped toward said shoe;

a closeable gate across said shoe in communication with the space bounded by said tank and said floors;

and an overflow passage sealed along the interior of the tank in open communication with the tank interior at a first location above said first-named hopper floor and at a second location directly below said first-named hopper floor.

References Cited by the Examiner

UNITED STATES PATENTS

| | | | |
|---|---|---|---|
| 1,021,332 | 3/12 | Ransome | 214—44 |
| 1,218,908 | 3/17 | Shutt | 214—46 X |
| 1,728,197 | 9/29 | Brown | 214—17 |
| 2,347,437 | 4/44 | Saxe | 214—16 |
| 2,606,676 | 8/52 | Dempster | 214—515 |
| 2,936,910 | 5/60 | Page | 214—17 |
| 3,024,930 | 3/62 | Sims | 214—2 X |
| 3,064,832 | 11/62 | Heltzel | 214—17 |

HUGO O. SCHULZ, *Primary Examiner.*

GERALD M. FORLENZA, *Examiner.*